Patented Sept. 24, 1929

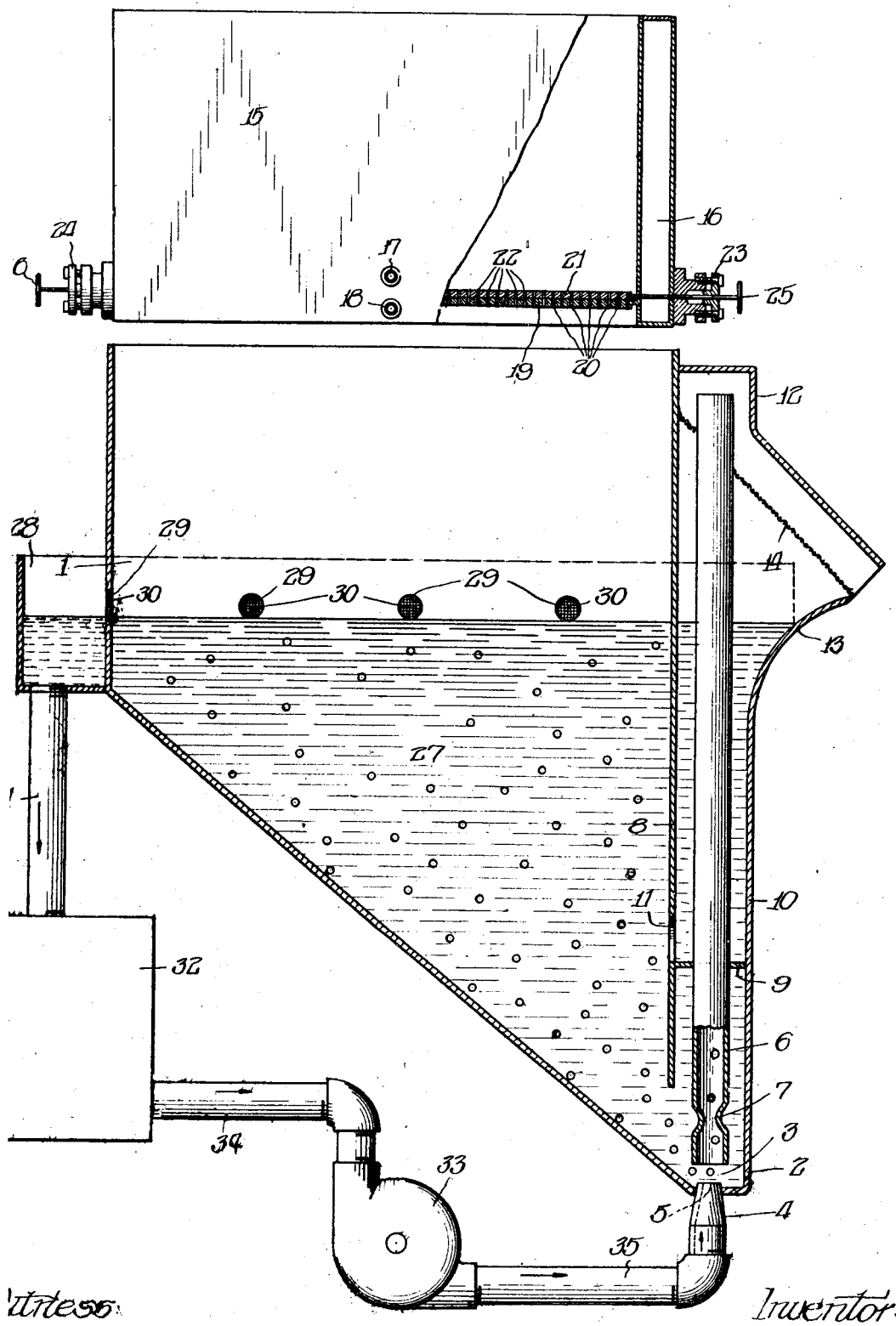

1,729,547

UNITED STATES PATENT OFFICE

JESSE R. POWELL, OF CHICAGO, ILLINOIS, ASSIGNOR TO ARMOUR & COMPANY, OF CHICAGO, ILLINOIS, A CORPORATION OF ILLINOIS

MEANS FOR SEPARATING SOLIDS FROM LIQUIDS

Application filed September 20, 1926. Serial No. 136,394.

The present invention relates to devices for removing solid matter from liquids and particularly to the removal of pellets formed under atmospheric pressure and hardened in a cooling liquid.

The primary object of the invention is the provision of apparatus of the kind described which is simple in construction and economical in its operation.

A further object of the invention is the provision of a device which is continuous in operation and does not require drawing off the liquid from the container, which ordinarily necessitates shutting down the machine and a loss of liquid, also the maintenance of the liquid at a constant low temperature.

That the invention may be better understood reference is had to the accompanying drawing and the following description whereon is disclosed one embodiment of the invention associated with apparatus for the formation of glue pellets.

The invention is susceptible of embodiment in many forms and is adapted for use with other forms of apparatus than that specifically shown and described. It is, therefore, to be understood that this disclosure is given for purpose of exemplification only and is not to be construed as unnecessarily limiting the protection defined by the appended claims.

In the drawing a sectional view is shown of the device associated with a glue pellet forming machine which constitutes no part of the present invention, the latter being shown in elevation with a portion broken away to reveal the means for forming glue pellets.

The device comprises a collecting tank 1, the side walls of which converge towards one corner 2. In the corner 2 an ejector 3 is provided which consists of a nozzle 4 having a relatively small opening 5 in the end thereof and a conduit 6 positioned with its lower end directly above and in spaced relation to the nozzle 4. A constricted portion 7 shaped in the form of a Venturi tube, is provided a short distance from the lower end of the conduit 6. The conduit extends upward above the level of the liquid in the tank 1 and is enclosed by the partition 8 and the baffle 9. The partition is disposed parallel with the outer side wall 10 of the tank and the baffle extends between the partition and the side wall a short distance above the bottom of the partition and surrounding the conduit 6. Directly above the baffle an opening 11 is provided in the partition 8, thus affording an escape between the partition and the wall 10 for the return flow.

The upper end of the conduit 6 is enclosed by means of a housing member 12 which is affixed to the partition 8 and extends over the end of the conduit and away from the side wall of the tank. The outer side wall 10 of the tank is curved outwardly at its upper end 13 to a point below the outer end of the housing member 12. A screen 14 extends from the partition 8 to the upper edge 13 of the side wall of the tank. The screen is inclined, with its lower end affixed to the wall 13 and completely surrounds the conduit 6.

Surrounding the tank 1, at the point where it is desired to maintain the level of the liquid 27, is a channel or trough 28 by means of which the liquid in the tank is drawn off through the ports 29 provided at intervals in the side walls of the tank and opening into the channel 28. The ports 29 are covered with a screen 30 to prohibit the passage of glue pellets therethrough. The liquid drawn off into the channel 29 is conducted through the pipe 31 to a refrigerating apparatus 32, which is shown conventionally as it may be of any convenient type. A pump 33 is provided to draw the liquid from the refrigerating apparatus and is connected to the refrigerating apparatus by the conduit 34. From the pump 33 a conduit 35 leads to the jet through which the pump forces the liquid taken from the refrigerating apparatus. It will thus be seen that the pump 33 performs the dual purpose of circulating the liquid through the refrigerating apparatus and forcing the same through the jet to remove the pellets from the liquid.

The glue pellet apparatus shown in the drawing comprises generally a tank 15 surrounded by a steam jacket 16. Steam is supplied to the jacket 16 by the pipes 17 and 18. The bottom 19 of the tank 15 is provided with a number of perforations 20. The effective opening of the perforations 20 is regulated by the false bottom 21 which is provided with a number of perforations 22 positioned to register with the perforations 20. Regulation of the device is obtained by means of the members 23 and 24 which include adjusting spindles 25 and 26, the inner ends of which abut against the false bottom 21 and are adapted to vary its position in relation to the bottom 20.

In operation the tank 15 is filled with glue which drops through the openings 20 and forms into pellets as it descends toward the liquid 27 in the tank 1. Upon striking the liquid the pellets are hardened and drop to the bottom of the tank. Due to the inclination of the side walls of the tank towards the corner 2, the pellets tend to assemble in that corner. Suitable means are provided, in the present instance the pump 33, for forcing fluid through the jet 4, and, due to the relatively small area of the opening 5 at the top of the jet, a stream of the liquid 27 of considerable force is directed into the conduit 6. The force of this stream is sufficient to transport the pellets collected in the corner 2, carrying them through the conduit and out the top thereof. The apparatus is made more effective by the provision of the Venturi portion 7 in the conduit 6 which tends to give a further impetus to the pellets.

As the pellets pass over the top of the conduit 6 they drop on to the inclined screen 14 and discharge over the end of the wall 13. The liquid which carries them through the conduit drops through the screen and passes downwardly between the partition 8 and the outer wall 10 and thence back into the container 1 through the opening 11.

The liquid 27 is kept at a constant temperature due to its circulation through the refrigerating apparatus 32. Cooling of the liquid is essential since due to the heat imparted to it by the glue pellets it becomes warmed and if cooling means were not provided it would not reduce the temperature of the glue pellets sufficiently to harden them.

Obviously there is no loss of liquid and it is not necessary to shut the device down for the removal of the pellets as it may be operated continuously since the pellets are removed as soon as they are formed and the liquid is maintained at a constant low temperature.

What I claim is:

1. A device for removing solids from liquid comprising a collecting tank having a lower portion thereof inclined towards one corner, an ejector positioned in said corner, the upper portion of said ejector comprising a conduit which extends above the level of the liquid, a partition surrounding said conduit and having an opening in the side wall thereof, a baffle positioned in said partition to direct the return flow through said opening into the tank, a screen positioned across the top of said partition and below the upper end of said conduit for separating the solid matter from the liquid.

2. A device for removing glue pellets from liquid comprising a tank for said liquid and collected pellets, the bottom of said tank being shaped to gravitate the formed pellets into a particular portion, an ejector located in said portion, said ejector comprising a jet nozzle and a conduit having the lower end thereof shaped in the form of a Venturi tube and positioned directly above said jet, a partition surrounding said conduit and having an opening therein, a baffle directly below said opening and surrounding said conduit for directing the return flow through said opening into the tank, a screen stretched between the outer wall of the tank and said partition near the top of said conduit, and a housing member positioned above the top of said conduit and directing the flow of liquid through said screen.

3. A device for removing solids from liquids comprising a collecting tank, a nozzle positioned in said tank, a conduit positioned directly above and in spaced relation to said nozzle, means for drawing the liquid from said tank, a refrigerating apparatus, and means for circulating the drawn-off liquid through said refrigerating apparatus and forcing it through said nozzle at a sufficient velocity to carry the solids therewith.

4. A device for separating solids from liquids comprising a collecting tank, a nozzle positioned in said tank, a conduit having one end thereof positioned in spaced relationship to said nozzle, a channel surrounding said tank, said tank being provided with ports opening into said channel, screening members covering said ports, a refrigerating apparatus, means for circulating the drawn-off liquid in said channel through said refrigerating apparatus and forcing the same through said nozzle at a sufficient velocity to carry the solids therewith.

5. A device for removing glue pellets from liquid comprising a tank for said liquid and collected pellets, said tank being so shaped as to gravitate said pellets in a particular portion thereof, a nozzle positioned in said portion, a conduit having one end positioned in spaced relationship to said nozzle and the other end extending above the level of the liquid, means for drawing off liquid from said tank, a refrigerating apparatus, means for circulating said drawn-off liquid through said refrigerating apparatus and forcing the same through said nozzle at sufficient velocity to carry said glue pellets therewith, and means for separating said glue pellets from said liquid.

6. A device for removing solids from liquids comprising a collecting tank, a nozzle in the lower portion of said tank, a conduit positioned directly opposite to and in spaced relation to said nozzle, means for forcing fluid through said nozzle with sufficient velocity to carry a portion of the liquid in said tank and the solid matter in said tank through said conduit and discharge the same at the other end thereof, means positioned at the outlet end of said conduit for separating the solid matter from the liquid, said last mentioned means comprising a housing having a screen therein presenting an inclined surface to the solid matter ejected from said conduit, said housing having an opening therein at the lower end of said screen to permit the solid matter to escape, and means associated with said housing for conducting the liquid passing through said screen back to said tank.

In testimony whereof I have hereunto subscribed my name.

JESSE R. POWELL.